Nov. 16, 1965  J. T. EDWARDS ETAL  3,218,436

ELECTRICAL AIRCRAFT HEATER

Filed March 12, 1963

INVENTORS
Jack T. Edwards
Charles K. Hughes
BY
Their Attorney

United States Patent Office 3,218,436
Patented Nov. 16, 1965

3,218,436
ELECTRICAL AIRCRAFT HEATER
Jack T. Edwards and Charles K. Hughes, Indianapolis, Ind., assignors to General Motors Corporation, Detroit, Mich., a corporation of Delaware
Filed Mar. 12, 1963, Ser. No. 264,575
4 Claims. (Cl. 219—544)

This invention pertains to electrical heaters for aircraft, and particularly to an improved electrical heater construction.

Heretofore, electrical aircraft heaters have been fabricated by sandwiching flexible-backed heating elements having etched or printed grids thereon between layers of insulating material and adhesively bonding this structure to an aircraft surface. Electrical heaters of this type have been used for both de-icing and anti-icing apparatus in accordance with the teachings of Patent No. 3,063,031. While the aforesaid type of electrical aircraft heater has been extensively used since it requires only a minimum of skilled labor to apply and presents a smooth aerodynamic surface, such heaters are subject to malfunctioning if a grid is broken.

It is well recognized that the impingement of foreign objects with aircraft surfaces at high speeds will often times result in damage to the aerodynamic outer surfaces of the aircraft, and if these surfaces should be equipped with the aforesaid type of electrical heater, a grid may be severed. Once a grid is severed, the entire heating element is rendered inoperative. The present invention relates to a built up electrical heater for aircraft surfaces which is immune to electrical shorting and open circuiting by virtue of the unique construction of the heater element.

Accordingly, among our objects are the provision of electrically heated anti-icing and/or de-icing apparatus for aircraft surfaces; the further provision of an electrical heater of the aforesaid type which is immune to shorting and/or open circuiting; and the still further provision of an electrical heater of the aforesaid type wherein the heating element comprises a carbonized or graphitized cloth.

The aforementioned and other objects are accomplished in the present invention by utilizing a cloth in which the exterior surfaces of the threads are carbonized or graphitized to provide the requisite electrical conductivity and resistance characteristics, while the cores of threads are substantially uncarbonized to provide a flexible cloth with the requisite strength. Bus bars are suitably connected to opposite ends of the carbonized cloth such that each thread extending between the bus bars constitutes an independent heating element. With this understanding, it will be apparent that if one of the threads should become broken, the remaining portion of the heater will remain operative, and at most, the heater will have a single, almost microscopic, cold spot.

Further objects and advantages of the present invention will be apparent from the following description, reference being had to the accompanying drawings wherein a preferred embodiment of the present invention is clearly shown.

Figure 1:
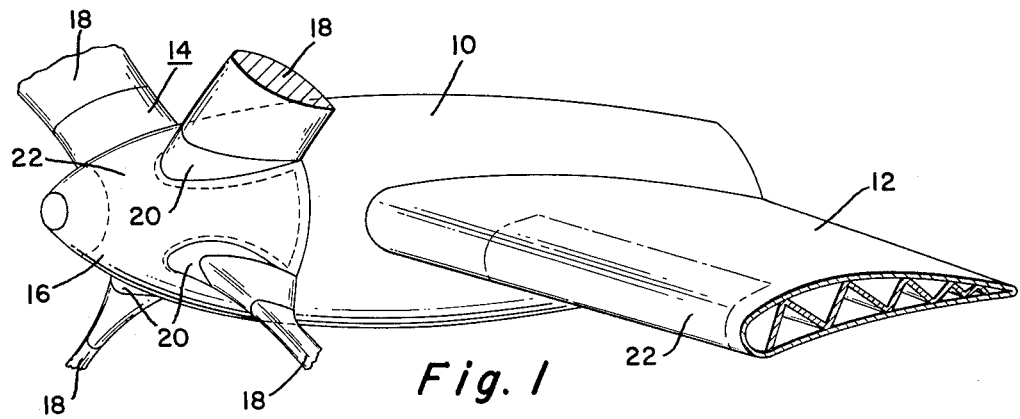
FIGURE 1 is a fragmentary perspective view, partly in section and partly in elevation, of a portion of an aircraft having electric heating apparatus constructed in accordance with the present invention.

With particular reference to FIGURE 1, a portion of an aircraft is depicted comprising an engine nacelle 10 mounted on a wing 12. A propeller 14 is driven by the engine and comprises a spinner 16 which encloses the root portions of a plurality of radially extending, variable pitch propeller blades 18. The propeller 14 may be of the type disclosed in Patent 2,986,220 and thus, the spinner 16, which is of substantially parabolic configuration includes four radially projecting islands 20 through which the blades 18 project.

Figure 2:
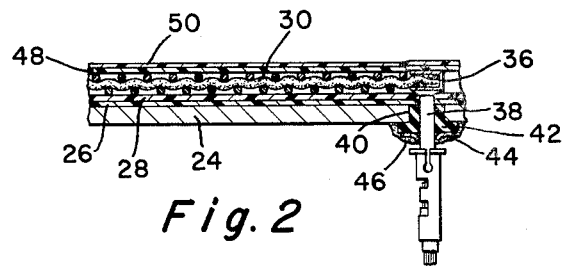
FIGURE 2 is an enlarged fragmentary sectional view of a typical cross section of an aircraft surface with an electrical heater attached thereto.

Preferably, although not necessarily, the shell of the spinner is composed of aluminum as is the skin of the wing 12. As depicted in FIGURE 1, the surface of the spinner 14 and the leading edge of the wing 12 may be equipped with electrical heating apparatus 22 constructed according to the present invention. In applying the electrical heater to either the spinner shell or the wing of an aircraft, the outer surface of the aluminum skin 24, as shown in FIGURE 2, is coated with an unfilled organic resin 26, such as a phenolic or an epoxy. Epoxy resins which are suitable include those which are a liquid phase resin having an epoxy equivalent of less than two hundred or a solid phase resin having a higher epoxy equivalent which is dissolved in any suitable solvent such as a ketone and ester or an ether alcohol. Preferably, the thickness of the resin coating 26 is .003 inch.

A Fiberglas sheet 28 impregnated with a cured electrical insulating thermosetting plastic material is bonded to the supporting surface 24 by the organic resin coating 26. The thickness of the Fiberglas sheet 28 may be on the order of .020 inch and, if desired, the Fiberglas sheet 28 may be preimpregnated with an epoxy resin and catalytic curing agent such as diamino diphenyl sulfone, or a phenolic or polyurethane resin. After the selected areas of the aircraft surface have been fitted with the Fiberglas sheets 28 and impregnated with an epoxy resin, heat is applied to these surfaces for approximately one hour and maintained at a suitable curing temperature.

Figure 3:
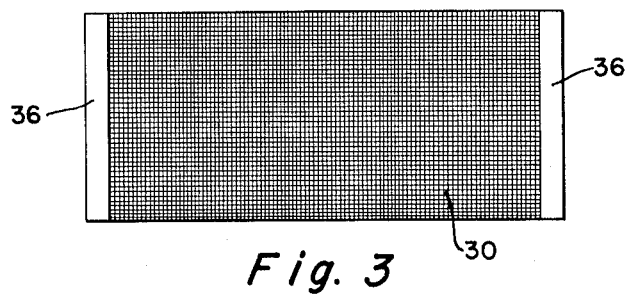
FIGURE 3 is an enlarged view, in elevation, of a typical carbonized cloth heating element with bus bars attached.
Figure 4:
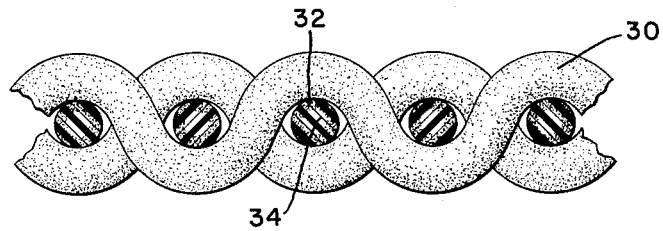
FIGURE 4 is an enlarged view, partly in section and partly in elevation, of a carbonized woven cloth.

The heating element, per se, is shown in FIGURES 3 and 4 and comprises a carbonized or graphitized cloth such as rayon. For example, this cloth 30, as shown in FIGURE 4, may be woven and thus has warp and woof threads, and each thread has an exterior carbonized surface 32 and a substantially uncarbonized core 34. Copper bus bars 36 are attached to opposite ends of the cloth 30 by painting the cloth in the bus bar area with a silver suspensoid which is reduced to the proper viscosity by the addition of a solvent. The desired wattage of each individual heater element is obtained by proper selection of the grade of the cloth and by connecting the individual cloth pieces in series.

Terminals 38 are attached to the bus bars 36 on the cloth heating element. As seen in FIGURE 2, openings 40 are drilled in the aircraft surface 24 after the resin coating 26 is applied thereto. The openings 40 receive rubber grommets 42 and the terminal which has been previously soldered or welded to the bus bar 36 extends through the grommet 42. Each terminal is held in position by a jam nut 44, after which the grommet and the jam nut are coated with epoxy 46 to secure the connection.

A coat of resin is applied over the cloth heating element 30, after which an exterior ply of Fiberglas 48 identical to the Fiberglas sheet 28 is applied over the entire surface. The assembly is again subjected to a suitable curing temperature, after which a fill coat of epoxy is applied to obtain the requisite aerodynamic smoothness. Thereafter, an abrasion and water erosion resistant covering 50 is applied over the Fiberglas sheet 48. This covering may comprise a spray coat of polyurethane filled with a pulverized ceramic material, or a liquid phase epoxy resin filled with pulverized ceramic material. Preferably the thickness of the abrasion and water erosion resistant coating is approximately .010 inch.

Electrical heating apparatus constructed according to the present invention can be readily applied to any aircraft surface of any shape or contour, and has excellent heat transfer characteristics. As is apparent, the process of applying the heater to a metallic aircraft surface requires a minimum of skilled labor. Moreover, by virtue of the unique features of the heating element, per se, the resultant heating apparatus can sustain severe damage while remaining functional, thereby obviating the necessity of constant repair as is often times required with etched or printed circuit heating elements such as heretofore used.

While the embodiment of the present invention as herein disclosed constitutes a preferred form, it is to be understood that other forms might be adopted.

What is claimed is as follows:

1. Electrically heated de-icing and anti-icing apparatus including, a metallic supporting surface, inner and outer layers of electrical insulating material, a carbonized cloth electrical resistance heating element interposed between the inner and outer layers of insulating material, said heating element comprising woven threads having a carbonized surface layer and a substantially uncarbonized core, and means carried by said metallic surface and insulated therefrom for electrically energizing said heating element.

2. Electrically heated de-icing and anti-icing apparatus including, a metallic supporting surface, inner and outer layers of electrical insulating material, a flexible carbonized-cloth-electrical resistance heating element interposed between the inner and outer layers of insulating material, said cloth being characterized by having threads with substantially fully carbonized exterior surfaces and substantially uncarbonized cores, and means insulated from and supported by said metallic supporting surface for energizing said heating element.

3. Electrically heated de-icing and anti-icing apparatus including, a metallic supporting surface, inner and outer layers of electrical insulating material, a flexible carbonized cloth electrical resistance heating element interposed between the inner and outer layers of insulating material, said carbonized cloth heating element comprising a woven rayon fabric having threads with substantially fully carbonized exterior surfaces and substantially uncarbonized cores, bus bars attached to opposite ends of said heating element, and terminals attached to said bus bars extending through and insulated from and supported by said metallic supporting surface for energizing said heating element.

4. Electrically heated de-icing and anti-icing apparatus including, a metallic supporting surface, inner and outer layers of electrical insulating material impregnated with a thermosetting resin, a carbonized cloth electrical resistance heating element interposed between the inner and outer layers of insulating material, said heating element comprising woven threads having a carbonized surface layer and a substantially uncarbonized core, means insulated from and supported by said metallic supporting surface for energizing said heating element, and an abrasion and water erosion resistant coating covering the outer layer of insulating material.

References Cited by the Examiner

UNITED STATES PATENTS

| | | | |
|---|---|---|---|
| 2,473,183 | 6/1949 | Watson | 219—543 |
| 2,503,457 | 4/1950 | Speir et al. | 219—528 |
| 2,564,325 | 8/1951 | Coonly | 244—134 |
| 2,627,012 | 1/1953 | Kinsella et al. | 244—134 |
| 2,853,589 | 9/1958 | Crooke | 219—543 |
| 2,942,330 | 6/1960 | Luke | 219—528 X |
| 2,985,860 | 5/1961 | Morey | 219—528 X |
| 2,992,317 | 7/1961 | Hoffman | 219—202 |
| 3,011,981 | 12/1961 | Soltes | 252—502 |
| 3,063,031 | 11/1962 | Edwards et al. | 338—275 |
| 3,120,597 | 2/1964 | Maloof et al. | 219—531 |
| 3,146,340 | 8/1964 | Dewey et al. | 219—544 X |

RICHARD M. WOOD, *Primary Examiner.*